Aug. 10, 1926.　　　　　　　　　　　　　　　　1,595,344
F. B. LOMAX
FILTER
Filed Jan. 31, 1924　　　4 Sheets-Sheet 2
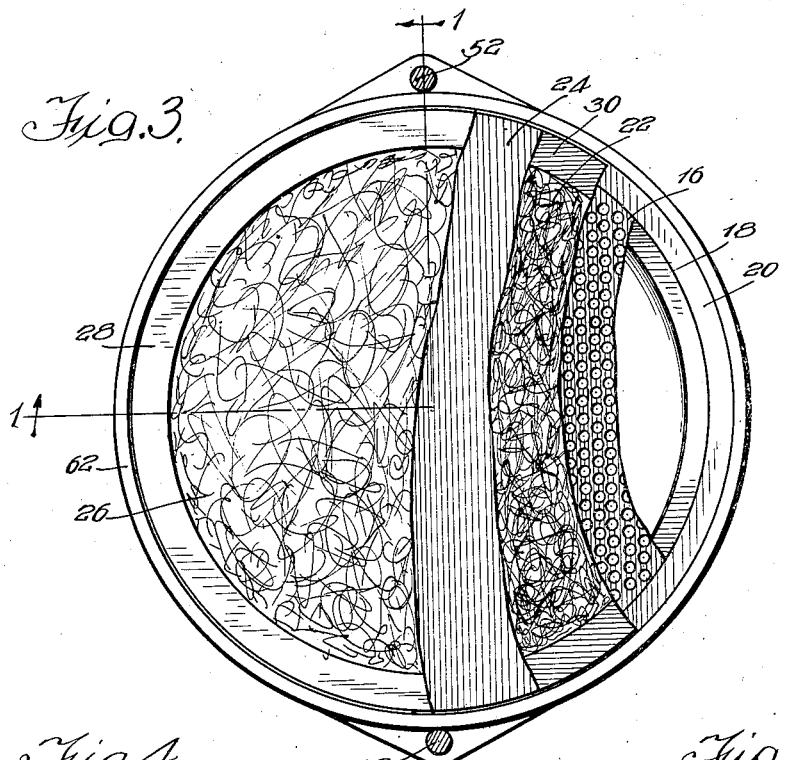
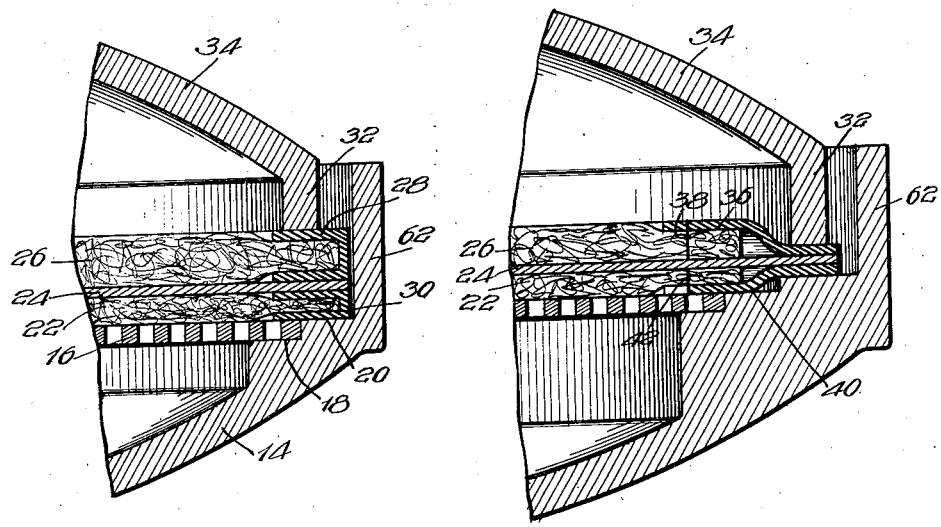
Witnesses:
W. F. Kilroy
Harry R. L. White
Inventor:
Frank B. Lomax

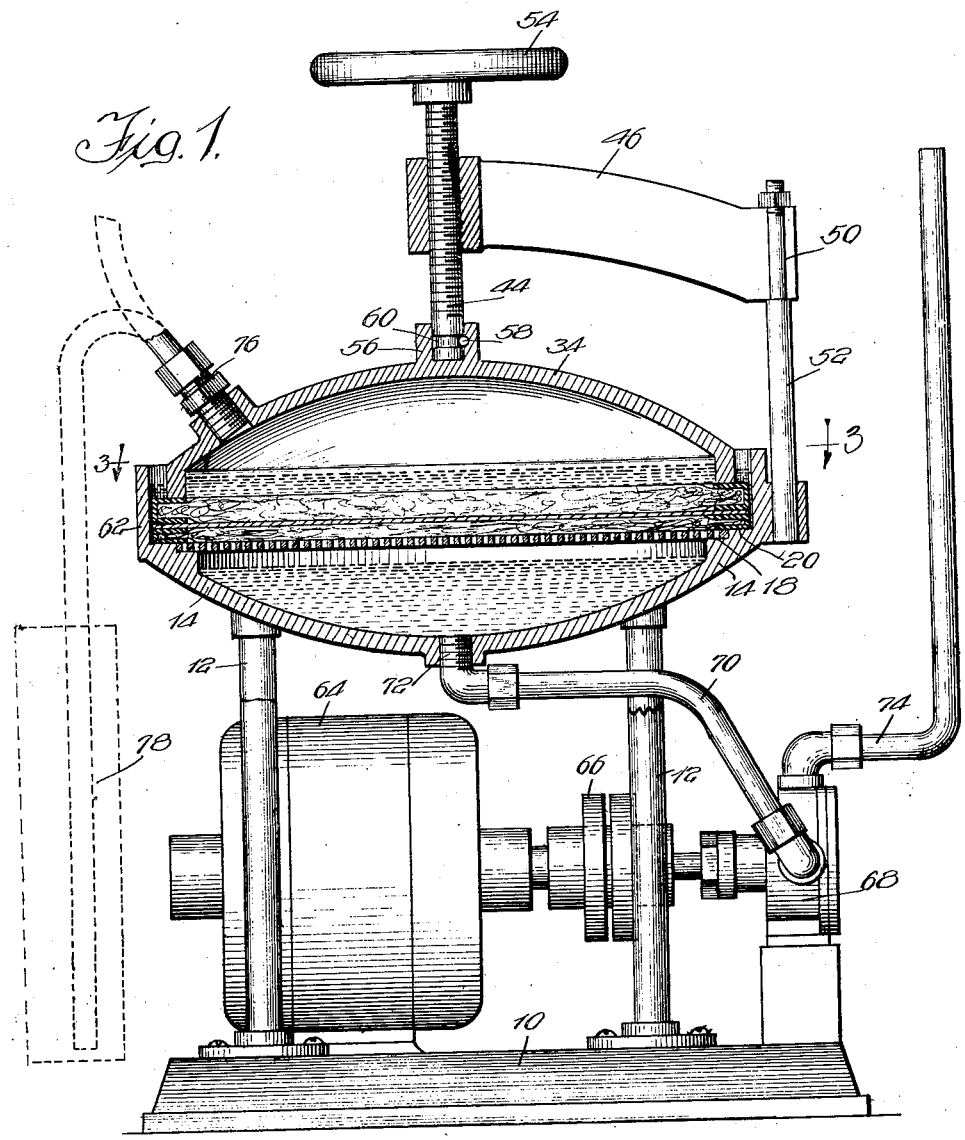

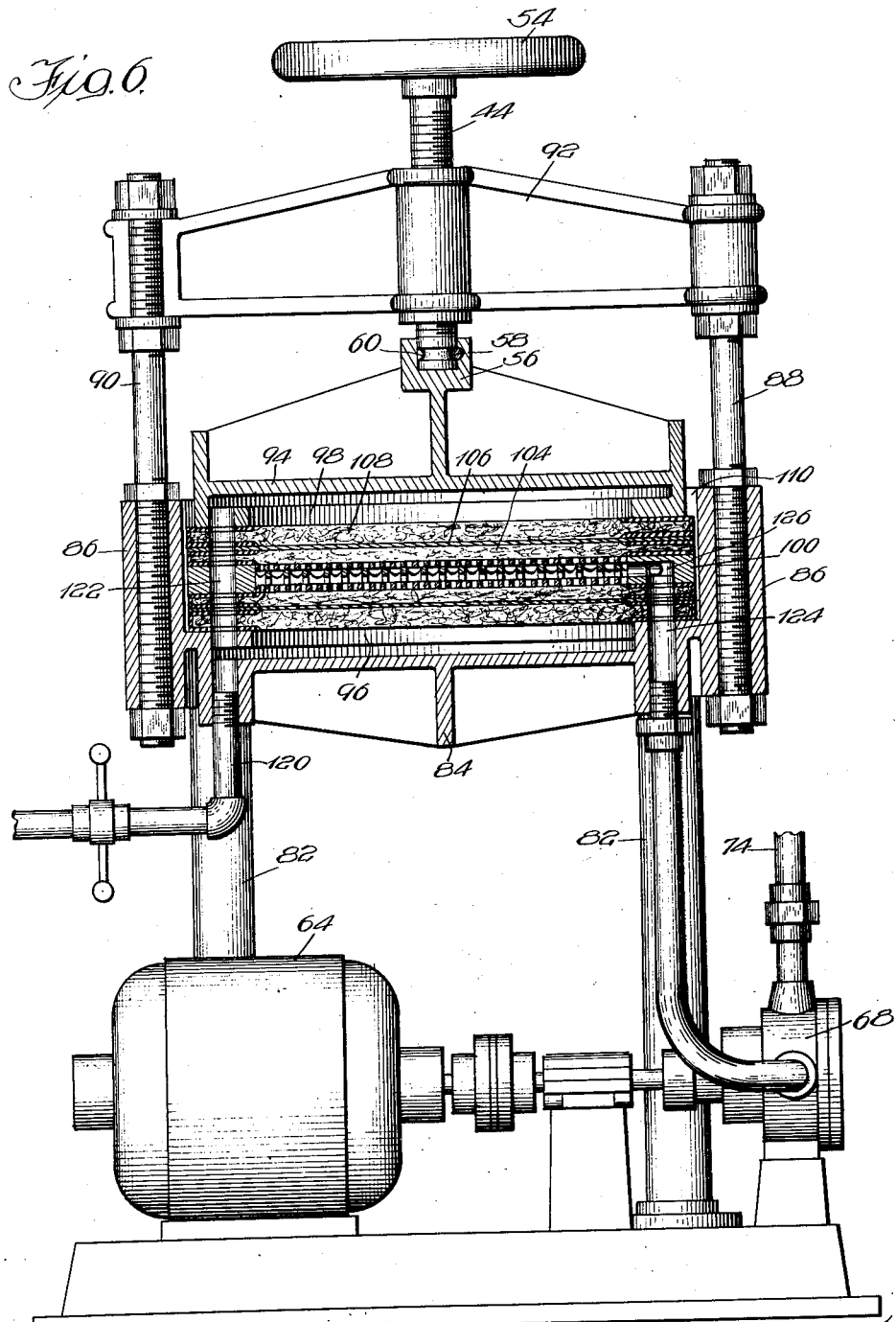

Aug. 10, 1926.

F. B. LOMAX 1,595,344

FILTER

Filed Jan. 31, 1924   4 Sheets-Sheet 4

Witnesses:
W. P. Kilroy
Harry R. L. White

Inventor:
Frank B. Lomax
Brown, Boettcher
& Dienner
Attys

Patented Aug. 10, 1926.

1,595,344

UNITED STATES PATENT OFFICE.

FRANK B. LOMAX, OF CHICAGO, ILLINOIS.

FILTER.

Application filed January 31, 1924. Serial No. 689,632.

My invention relates to filtration, and more specifically to an improved and compact apparatus and a superior method of separation.

Among the objects and advantages of the invention may be enumerated the protection of the filtering elements from shocks; the automatic apportionment of the power of a single pump between the work of drawing in the supply and the work of forcing the material through the filter; and sealing against leakage and the easy detection of leaks.

In the accompanying drawings,

Fig. 1 is a side elevation partly in section on line 1—1 of Fig. 3 of one embodiment of apparatus according to the invention;

Fig. 2 is a detail section of the filtering unit;

Fig. 3 is a section substantially on line 3—3 of Fig. 1;

Fig. 4 is an enlarged detail section of the edge seal;

Fig. 5 is a similar section of a modified construction;

Fig. 6 is a section similar to Fig. 1 of a double filter construction;

Figure 7:
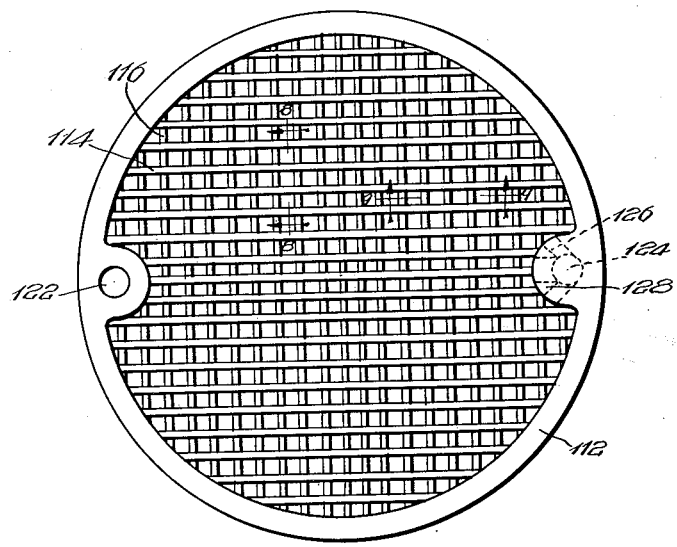
Fig. 7 is a plan view of the honeycomb.
Figure 8:
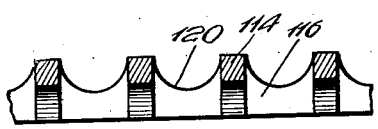
Figure 9:
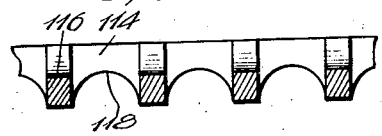

Figs. 8 and 9 are detail sections on lines 8—8 and 9—9 of Fig. 7; and

Figure 10:
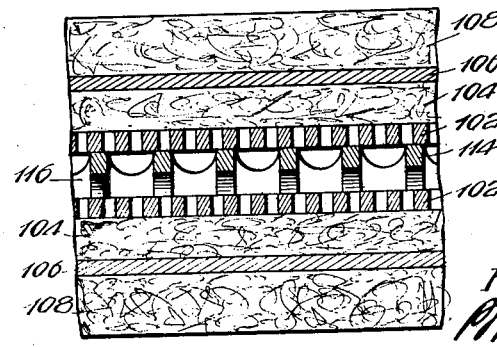

Fig. 10 is an enlarged detail section of the honeycomb and both filtration barriers.

In the embodiment of apparatus according to the invention selected for illustration, the base 10 carries standards 12 upon which the lower cup 14 is mounted. Supported by this cup is a foraminated metal plate 16 resting on annular flange 18, with its upper surface substantially flush with an outer annular surface 20. This provides a substantially flat supporting surface for the first pad 22. On top of pad 22 lies the primary filtering element 24, and on top of that the preliminary filtering element 26, the primary filtering element being, in this instance, a piece of filter paper, and the preliminary filtering element being a pad of coarser material, such as felt, of relatively great thickness.

I have discovered that the amount of material that can be removed by a filtering obstacle such as that disclosed, is out of all proportion to what could be accomplished by the use of the primary element 24 alone. While I am unable to state definitely the reason for this, I believe it is because the relatively larger particles in the liquid being filtered are entangled and trapped in the fibers of the preliminary filtering elements 26. These particles may well constitute more than nine-tenths of the total mass of material removed by filtration, and only the remainder arrives as a deposit on the surface of the primary element 24. In addition to the enormous increase in the mass of material that can be accumulated before cleaning without clogging the filter, there is also an advantage in the cleaning, as the preliminary filtering element 26 will contain only the coarser particles for the separation of which it is best fitted, and can be cleaned for further use more efficiently, because most of the fine material trapped by element 24 will remain on or in the pores of said element when the parts are separated. The depth of the material is also of importance. It will be apparent that particles covering areas of dimensions equal to substantially the thickness of the preliminary filtering element 26 may lie on the surface of said element without preventing free supply to all points on the primary element 24 of all the liquid said primary element can successfully handle. This is because the relatively coarse material will permit the liquid passing through it to flow laterally, and equalize the pressure on element 24 by passing around the obstacle.

The particular unit illustrated operates by suction at pressures which will be usually below atmosphere within the filteration chamber. To prevent air from entering through the filtering elements, and at the same time provide a very simple and inexpensive construction, I employ annular facings 28 and 30 on the two outside elements 26 and 22, respectively. In the embodiment illustrated in Figs. 1 and 4, these facings each lie on both sides of the element they encircle, and will remain in place without any permanent fastening means whatever. The edges of the three elements 22, 24 and 26 are superposed and clamped against support 16 and flange 20 by the depending lip 32 of an inverted cup 34 cooperating with cup 14 to define the filtration chamber.

In the embodiment illustrated in Fig. 5, facing 36 is a simple annulus of ordinary flat sheet rubber stitched to element 26 at 38, and facing 40 is similarly stitched at 42 to element 22. When this construction is employed, lip 32 clamps down on the facings and the outer margin of element 24 only, elements 22 and 26 being cut small enough to terminate inside the lip.

In either construction, a satisfactorily air tight joint is quickly obtainable by forcing cup 34 firmly into place with clamping screw 44, and, at the same time, the upper cup may be removed and all the parts quickly lifted out for cleaning and replacement.

To facilitate quick removal and replacement of cup 34, I mount it on a yoke 46, which yoke is pivoted on a support 48 rising from one side of cup 14, and has a notched end 50 to receive the upper portion of the opposite support 52. Screw 44 controlled by hand wheel 54 enters a boss 56 on cup 34, and is held in place in said boss by suitable means, such as cotter pin 58 riding in an annular groove 60. It will be apparent that by rotation of hand wheel 54, cup 34 can be quickly lifted clear of the upwardly projecting lip 62 of cup 14, and swung to one side to expose the filtering element.

Housed under cup 14 between standards 12, is a source of power 64, in this instance direct connected through coupling 66 with a centrifugal or other suitable pumping means 68. The intake of the pump may be connected by pipe 70 to an outlet 72 at the bottom of cup 14, and the outlet may deliver material through pipe 74 to any suitable point.

Cup 34 is provided with an inlet connection at 76, which is diagrammatically illustrated as connected to a source of supply 78, in this instance, at a lower level than the filtration chamber.

To start operation, with cup 34 removed, cup 14 may be filled with liquid for priming if desired, although it is not necessary. The filtration barrier comprising elements 16, 22, 24 and 26, is put in place, cup 34 placed over the same and firmly pressed down into position by tightening screw 44. The pump is now started. The initial withdrawal of material from cup 14 will draw the atmospheric air in cup 34 through the filtration barrier until a vacuum is created in cup 34 sufficient to overcome the difference in head between supply 78 and the chamber. This immediately results in a supply of liquid being discharged into the chamber through inlet 76, and this liquid spreads out over the filtration barrier, forming an effective seal to prevent the withdrawal of more air from cup 34. Further removal of liquid from cup 14 will expand the small amount of air already drawn into the lower cup to a much higher vacuum than that in the upper cup, and this difference in pressure is effective to force the liquid on top of the filtration barrier downward through it. It will be apparent that as long as the vacuum in cup 34 is sufficient to compel a flow through inlet 76 equal to the rate of discharge by percolation through the filtration barrier, the liquid seal above the filtration barrier will be maintained, and all the power of the pump will be utilized in maintaining the outstanding pressure difference between cup 34 and 14. If, however, due to a lowering of the liquid level in the source of supply 78, or for any other reason, the supply through inlet 76 should become less than the delivery through the filtration barrier, the liquid seal will be broken, and air from cup 34 will quickly pass through the filtration barrier, raising the vacuum in cup 34 to a higher value, sufficient to reestablish a flow through inlet 76 at a rate that will reestablish and maintain the liquid seal. The apportionment of the power of source 64 to the work of drawing material into cup 34 and drawing it through the filtration barrier, is thus automatically varied to precisely fit the conditions of operation at the time, as much power as may be needed being employed to draw the material into the filtration chamber and the balance being effective on the filtration barrier itself.

It will be obvious that in addition to the automatic adjustment of pressure differences, this provides an air cushion between the filtration barrier and the source of supply, and another air cushion between the filtration barrier and the system to which the liquid is delivered. If either of these systems were so constructed or manipulated that the liquid in them were subjected to violent changes in movement so as to hammer the piping, the filtration barrier would be subjected to none of this hammering.

Lip 62 defines an annular trough at the bottom of which is the peripheral seal for the filtration elements. When the operation is below atmospheric pressure, this trough is preferably filled with a small quantity of the filtrate. This has two advantages; first, any peripheral leakage that may occur will not fill the system with air; and second, any such leakage may be immediately noticed by the fall of the liquid in the peripheral trough, and screw 54 may be tightened to stop it. Similarly, when the operation is above atmospheric pressure, any leakage will accumulate in the trough and afford an indication that the parts are not clamped together with sufficient tightness.

In the larger double filter illustrated in Fig. 6, standards 82 support the lower cup, which has a trussed bottom, 84. Bosses 86 support standards 88 and 90 corresponding to standards 48 and 52 of Fig. 1. Yoke 92 is mounted for the same operation as yoke 46, and supports the upper cup 94, also of trussed formation, for lightness.

Between lip 96 on cup 84 and lip 98 on cup 94 is clamped the filtering stack comprising the central honeycomb 100, supporting diaphragms 102 on both sides of it, substantially identical with diaphragm 16 of Fig. 4, supporting pads 104 outside both diaphragms, primary filtering elements 106 outside both pads, and preliminary filtering elements 108 outside both primary filtering elements. Cup 84 has a peripheral lip 110 high enough to provide a sealing trough for the entire stack.

Honeycomb 100 comprises an annular rim 112 carrying a net work of vertical walls 114 and 116. Between their unions with wall 116, walls 114 are cut away from one surface of the honeycomb as at 118, and similarly between their junction points walls 116 are cut away from the other face of the honeycomb, as at 120. This provides good mechanical support for both diaphragms 102, and, at the same time, establishes passageways for free flow of liquid throughout the honeycomb.

Intake pipe 120 opens in line with a passageway 122 defined by aligned apertures in the peripheral edges of all the elements forming the filtering stack, as well as both inside lips 96 and 98. This delivers the incoming fluid both above and below the filtering stack. Opposite passageway 122 is passageway 124 extending up only to the honeycomb 100 and communicating therewith through radiating passageways 126 in the boss 128. Lip 98 is undercut throughout, but lip 96 is undercut all except the portion housing passageway 124 which is cast solid with the bottom of the cup, as clearly shown in Fig. 6.

It will be apparent, that in addition to all the advantages of the structure of Fig. 1, that of Fig. 6 has substantially double the filtering capacity for a filtration stack of the same diameter, with only a negligible increase in size in the outfit as a whole.

Another advantage of my filter which is particularly adapted for filtering syrups and the like, has to do with the de-aeration of the solution or syrup.

As is well known to syrup manufacturers, bacteria is the cause of fermentation which is responsible for much loss in syrup manufacture. The life and growth of bacteria depends upon the supply of air in the syrup. Obviously, by removing air from the syrup, this fermentation-causing bacteria can be destroyed.

Now by subjecting the solution or syrup in my construction to a vacuum, any air therein will be sucked therefrom before the solution is drawn through the filter.

Also besides destroying bacteria that causes fermentation losses de-aeration of the solution or syrup, makes it easier for the syrup to absorb carbonic acid gas thus eliminating foaming when the syrup is bottled. Of course it is to be understood that although I have disclosed my filter as being particularly adapted for filtering syrup, it may be used equally well for filtering other analogous liquids.

Without further elaboration, the foregoing will so fully explain the gist of my invention, that others may, by applying current knowledge, readily adapt the same for use under various conditions of service without eliminating certain features which may properly be said to constitute the essential items of novelty involved, which items are intended to be defined and secured to me by the following claims.

I claim:—

1. The method of filtering by suction which comprises, enclosing spaces above and below a filtering barrier, filling the lower space with liquid and the upper with gas, connecting the gas filled space to a liquid supply, and withdrawing liquid from the liquid filled space to draw gas through the filtering barrier and generate a vacuum to draw in liquid from the supply.

2. The method of filtering which comprises, enclosing spaces above and below a filtering barrier, filling each space partly with liquid and partly with compressible gas, and generating a pressure difference to force the liquid above the filter downwardly through it.

3. The method of filtering which comprises, enclosing spaces above and below a filtering barrier, filling each space partly with liquid and partly with compressible gas, and acting on the liquid to generate a pressure difference to force the liquid above the filter downwardly through it.

4. The method of filtering which comprises, enclosing spaces above and below a filtering barrier, connecting the upper space with a liquid source of supply, establishing a flow by withdrawing material from the lower space, keeping said upper space partly filled with air and partly with liquid, and automatically maintaining in said upper space a difference in head between the space and the liquid supply only sufficient to maintain an influx substantially equal to the efflux through the filtering medium.

5. In combination, a lower cup-like member having an internal annular shoulder, a filter disposed on the said shoulder, an upper cup-like member disposed on top of the filter, an annular trough intermediate the two cup-like members immediately over the said shoulder, the said portion of the filter resting on the said shoulder serving as a bottom for the said trough and a liquid seal disposed in the said trough.

6. In a filter, a receptacle, a filtering barrier associated therewith, means for establishing a mechanical seal between the barrier and the receptacle, and means for submerging said mechanical seal in a liquid to form a liquid seal.

7. In a filter, a container, a filtering barrier associated therewith, means for establishing a mechanical seal between the barrier and container, means defining a trough associated with the said seal, and means including a liquid disposed in the said trough for submerging the mechanical seal in liquid to form a liquid seal.

8. In a suction filter, a receptacle, suction means connected to the said receptacle, a filtering barrier associated with the said receptacle, means for clamping the barrier to the receptacle to establish a mechanical seal therebetween, and means for submerging said mechanical seal in a liquid to form a liquid seal, said liquid seal being open to inspection for detection of leak by the change in liquid level.

In witness whereof, I hereunto subscribe my name this 3rd day of January, 1924.

FRANK B. LOMAX.